United States Patent
Hau et al.

(10) Patent No.: US 6,192,097 B1
(45) Date of Patent: *Feb. 20, 2001

(54) DEVICE FOR RETAINING A HOT MELT IN PARTICULAR A CORE MELT-THROUGH INSIDE THE SPREADING CHAMBER OF A NUCLEAR REACTOR INSTALLATION

(75) Inventors: Gerhard Hau, Albstadt; Lothar Wistuba, Herzogenaurach; Josef Hollmann, Schluesselfeld; Manfred Fischer, Erlangen, all of (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/651,307

(22) Filed: May 22, 1996

Related U.S. Application Data (63) Continuation of application No. PCT/DE94/01329, filed on Nov. 10, 1994.

(30) Foreign Application Priority Data

Nov. 23, 1993 (DE) ................................. 43 39 904

(51) Int. Cl.$^7$ ........................................ G21C 9/00
(52) U.S. Cl. .......................................... 376/280
(58) Field of Search ............................... 376/280

(56) References Cited

U.S. PATENT DOCUMENTS

| H91 | * | 7/1986 | Gabor et al. ..................... 376/280 |
| 3,607,630 | * | 9/1971 | West et al. ....................... 376/280 |
| 3,677,892 | * | 7/1972 | Schabert ........................... 376/280 |

(List continued on next page.)

FOREIGN PATENT DOCUMENTS

| 2557884 | 6/1977 | (DE) . |
| 2459339 | 12/1977 | (DE) . |
| 4032736 A1 | 4/1992 | (DE) . |
| 4041295 A1 | 7/1992 | (DE) . |
| 4237245 A1 | 5/1993 | (DE) . |

(List continued on next page.)

OTHER PUBLICATIONS

Trans. ANS, vol. 13, No. 2, pp. 720,721, Fontana, Nov. 1970.*
"Improved Containment Concept for Future Pressurized Water Reactors", Hennies et al., Proceedings of the fifth International Conference on Emerging Nuclear Energy Systems, Karlsruhe 1989, pp. 19–24.
"Improved Containment Concept for Future Pressurized Water Reactors", Hennies et al., Proceedings of the fifth International Conference on Emerging Nuclear Energy Systems, Karlsruhe 1989, pp. 19–24.

*Primary Examiner*—Harvey E. Behrend
(74) *Attorney, Agent, or Firm*—Herbert L. Lerner; Laurence A. Greenberg; Werner H. Stemer (57) ABSTRACT

A retaining device has a multi-layer protective cladding for protecting the bearing and containment structure of a spreading chamber for the controlled spread and cooling of a melt from a nuclear reactor pressure vessel. The spreading chamber is configured under the spreading concept, i.e. the melt spreads and cools therein. The protective cladding has at least two layers: an outer sacrificial layer acts as a thermal shock barrier and melting substance; a protective and insulating layer, disposed inside the sacrificial layer and protecting the underlying bearing and containment structure, acts as thermal protection layer and retaining layer for the hot melt. The protective and insulating layer includes a first partial layer of fireproof concrete adjacent the bearing and containment structure, and a second partial layer of temperature-resistant ceramic blocks, in particular $ZrO_2$ adjacent the sacrificial layer.

9 Claims, 10 Drawing Sheets

U.S. PATENT DOCUMENTS

| | | | |
|---|---|---|---|
| 3,702,802 | * 11/1972 | Jansen, Jr. | 376/280 |
| 3,930,939 | * 1/1976 | Bittermann et al. | 376/280 |
| 3,979,866 | 9/1976 | Prescott | 52/249 |
| 4,003,785 | * 1/1977 | Rau et al. | 376/280 |
| 4,036,688 | * 7/1977 | Golden et al. | 376/280 |
| 4,045,284 | * 8/1977 | Rosewell | 376/280 |
| 4,073,682 | * 2/1978 | Barleon et al. | 376/280 |
| 4,116,764 | * 9/1978 | Jones | 376/280 |
| 4,121,970 | * 10/1978 | Albrecht et al. | 376/280 |
| 4,226,676 | 10/1980 | Barnes | 176/38 |
| 4,289,582 | * 9/1981 | Parr et al. | 376/280 |
| 4,412,969 | * 11/1983 | Tilbrook et al. | 376/280 |
| 4,464,333 | * 8/1984 | Wohlsen | 376/280 |
| 4,584,802 | * 4/1986 | Casselman et al. | 376/280 |
| 5,049,352 | * 9/1991 | Tutu et al. | 376/280 |
| 5,192,494 | * 3/1993 | Becker et al. | 376/280 |
| 5,263,066 | * 11/1993 | Szabo et al. | 376/280 |
| 5,307,390 | * 4/1994 | Gou et al. | 376/280 |
| 5,343,505 | * 8/1994 | Serviere | 376/280 |
| 5,343,506 | * 8/1994 | Artnik et al. | 376/280 |
| 5,349,615 | * 9/1994 | Ferroni | 376/280 |
| 5,402,456 | * 3/1995 | Schabert, II et al. | 376/280 |

FOREIGN PATENT DOCUMENTS

| | | | |
|---|---|---|---|
| 4211030 A1 | 10/1993 | (DE) . | |
| 4211283 A1 | 10/1993 | (DE) . | |
| 0105800 A1 | 4/1984 | (EP) . | |
| 0392604 A1 | 10/1990 | (EP) . | |
| 0545767 A1 | 6/1993 | (EP) . | |
| 2030347 | * 4/1980 | (GB) | 376/280 |
| 2052133 | * 1/1981 | (GB) | 376/280 |
| 2236210 | 3/1991 | (GB) . | |
| 1118300 | 6/1980 | (RU) . | |

* cited by examiner

DEVICE FOR RETAINING A HOT MELT IN PARTICULAR A CORE MELT-THROUGH INSIDE THE SPREADING CHAMBER OF A NUCLEAR REACTOR INSTALLATION

CROSS-REFERENCE TO RELATED APPLICATION

This is a continuation of international application Serial No. PCT/DE94/01329, filed Nov. 10, 1994, which designated the United States.

BACKGROUND OF THE INVENTION

1. Field of the Invention

The invention relates to a retaining device with a multilayer protective cladding for protecting the bearing and containment structure of a spreading chamber, for the controlled spreading and cooling of a hot melt, in particular a core melt, which after emerging from the nuclear reactor pressure vessel of a nuclear reactor installation designed on the spreading concept can be carried into a spreading chamber and cooled therein.

2. Description of the Related Art

It has been known heretofore, for retaining core melt emerging from a reactor pressure vessel of a nuclear reactor installation, to dispose a crucible-like catching container directly below the reactor pressure vessel, in the reactor cavern carrying the reactor pressure vessel. The catching container can hold the core melt within a compact volume and can be cooled both on its outside and in its interior. British Patent 2 236 210 A describes one such retaining device with a catching container, also called a core catcher. The core catcher is embodied by a supporting structure that is spaced apart from the wall and bottom of the reactor cavern and is supported by support elements disposed on the bottom. In the interior, the core catcher is lined with a core retention layer of zirconium oxide blocks. The core retention layer is lined with a sacrificial layer, preferably of a steel, for its protection during normal power plant operation. The core retention layer is thus sandwiched between the bearing structure and the sacrificial layer. For mechanical stability of the sacrificial layer, the zirconium oxide blocks are joined to one another and to the bearing structure and to the sacrificial layer by a zirconium oxide cement. To enable the core catcher to hold all the emerging core melt, the container is drawn upward in crucible fashion to beyond the bottom of the reactor pressure vessel. As a result the core melt can be caught in a kind of smelting crucible with a small directly-coolable surface area.

A retaining device for receiving a spreading core melt is described in the conference offprint "Emerging Nuclear Energy Systems 1989, ICENES '89, Karlsruhe July 3–6, Proceedings of the Fifth International Conference on Emerging Nuclear Systems, pp. 19–24; see particularly FIG. 1 on page 23 in conjunction with the text on page 21. In that known retaining device, a cooled catch basin (core catcher) is likewise disposed inside the reactor containment directly below the reactor pressure vessel; in this basin, the melt can spread over a large area and can be cooled with water in direct contact with an enlarged surface area. The steam generated by the decay heat of the melt condenses in the upper part of the steel shell of the reactor containment and from there flows back to the retaining device. Specifically, the bottom of the catch basin is supported by a support structure made up of double-T beams, and is formed by a perforated steel plate. Core melt can be cooled directly with water both through the steel plate and via openings in the wall of the catch basin. What is known as a "sacrificial concrete layer" is located on the steel plate. That sacrificial layer is reinforced in the surface region of the shielding pit, or in other words below the reactor pressure vessel. Cooling water in the lower part of the reactor containment permanently surrounds the catch basin. The cooling water can also spread along the top of the sacrificial layer, or in other words the surface of the sacrificial layer toward the reactor pressure vessel. However, as much as possible, an immediate contact of a core melt emerging from the rounded bottom portion of a reactor pressure vessel with water should be avoided. Moreover, in the known retaining device the water layer below the catch basin is the only protective layer for the structural concrete located beneath it.

SUMMARY OF THE INVENTION

It is accordingly an object of the invention to provide a device for retaining a hot melt, in particular a core melt-through inside the spreading chamber of a nuclear reactor installation, which overcomes the above-mentioned disadvantages of the heretofore-known devices and methods of this general type and which provides for improved protection for the bearing and containment structure of a catch space. Moreover, the retaining device should be constructed such that immediate direct contact of descending core melt masses with the cooling water cannot occur, so as to enable delayed and metered water cooling.

In general terms, the above-noted objects further pertain to a retaining device for a hot melt. The more specific object of the invention, however, can be defined as follows: In a retaining device for a core melt that operates on the spreading concept and in which, after spreading of the core melt, the core melt is cooled on its outer surface, in particular with water, the following problems are to be solved:

- preventing contact of the core melt with the bearing and containment structure in general and with the structural concrete of the building or structural concrete in particular, and preventing erosion of the concrete;
- stabilizing the core melt in the region of the protective cladding, especially above the protective and insulating layer;
- varying properties and consistency of the core melt, such as viscosity, melting point, fragmentation;
- reducing the thermal burden from the core melt on the bearing and containment structure of the spreading chamber.

With the foregoing and other objects in view there is provided, in accordance with the invention, a retaining device for core melt in a spreading chamber of a water-cooled nuclear reactor installation, wherein the spreading chamber has a bearing and containment structure and is configured for controlled large-area spreading and cooling of a core melt in the case of a core meltdown. The retaining device comprises:

- a multi-layer protective cladding disposed on and protecting the bearing and containment structure of the spreading chamber;
- the protective cladding including an outer sacrificial layer acting as a thermal shock barrier and as melting substance, and a protective and insulating layer for the bearing and containment structure downwardly adjacent the sacrificial layer;
- the protective and insulating layer including a first partial layer of fireproof concrete adjacent the bearing and containment structure, and a second partial layer of temperature-proof ceramic blocks adjacent the sacrificial layer.

In other words, the retaining device of the invention has a protective liner, i.e. a protective cladding formed with at least two layers including the and which is composed of the following:

an outer sacrificial layer as a thermal shock barrier and as melting substance, and a protective and insulating layer, adjacent the inside of the sacrificial layer, for the bearing and containment structure located beneath, which as thermal protection and as a retention layer for the hot melt includes:

a first partial layer of fireproof concrete adjoining the bearing and containment structure, and a second partial layer of temperature-proof ceramic blocks adjoining the sacrificial layer.

The advantages attainable with the invention are considered above all to be that the novel retaining device, because of its specific layer construction, is capable of resisting the chemical strain, the pressure strain, and the temperature strain of a spreading core melt, without involving the bearing and containment structure of the spreading chamber in the process, even if the core melt is not cooled on its underside. Cooling of the core melt at its top is advantageous for the sake of rapid dissipation of the further fission or decay heat and for shielding reasons and is within the scope of the preferred embodiment of the invention in retaining and cooling a core melt. In the case of a hot melt that is not a core melt, water cooling of the surface may be dispensed with under some circumstances.

In accordance with an added feature of the invention, the ceramic blocks of the second partial layer are zirconium oxide blocks. In a preferred embodiment, the zirconium oxide blocks are parallelepiped, and horizontally adjacent blocks have expansion seams therebetween.

In accordance with another feature of the invention, the protective and insulating layer is anchored to the bearing and containment structure. In a preferred embodiment, there are provided tie bolts anchored in the bearing and containment structure, the tie bolts penetrating the first partial layer of fireproof concrete and projecting into voids formed on or in between the ceramic blocks, wherein the voids can be filled with fireproof concrete.

In other words: For the second partial layer of the protective and insulating layer, $ZrO_2$ blocks, as ceramic blocks, have proven to be especially expedient. To secure the position of the ceramic blocks, the protective and insulating layer is preferably anchored to the bearing and containment structure. A favorable anchoring system provides that voids that can be filled with fireproof concrete are provided on or between the ceramic blocks and receive the heads or nuts of tie bolts, and that the tie bolts are anchored in the bearing and containment structure and penetrate the first partial layer of fireproof concrete.

From a production and assembly standpoint it is recommended that parallelepiped zirconium oxide blocks and expansion seams between these zirconium oxide blocks that are adjacent to one another horizontally be provided. The expansion seams take the heat expansion coefficient of the zirconium oxide blocks into account, which is higher than that of fireproof concrete.

In accordance with an additional feature of the invention, a metal plate, such as a steel plate, covers the protective and insulating layer or the ceramic blocks.

In accordance with again an added feature of the invention, a sacrificial concrete layer covers the metal plate.

In accordance with again another feature of the invention, a zirconium fiber layer is disposed between the metal plate and the protective and insulating layer, and a metal lattice grating is disposed on the zirconium fiber layer. The latter is preferably either a zirconium felt, a zirconium non-woven, or an equivalent.

In accordance with again a further feature of the invention, there is provided a sacrificial concrete layer covering the protective and insulating layer.

In accordance with yet an added feature of the invention, the device includes a cooling system with temperature-dependently opening feed channels integrated in the sacrificial layer, for supplying coolant to the melt upon contact with the melt. The cooling system may include a pipeline system penetrating the sacrificial layer, the pipeline system including pipes with upwardly-projecting, normally closed inlet necks which melt upon coming into contact with the melt. Or the cooling system may include a multiplicity of coolant deposits in the form of meltable containers embedded in the sacrificial layer and distributed over a bottom face thereof. Water may be utilized as a coolant.

The metal plate preferably is covered with a sacrificial concrete layer on its outside. Sacrificial concrete of this kind is used up gradually in the melting process; it delays heating up of the core melt, can make the core melt less viscous, and thus contributes to fragmentation. Fragmentation is understood to be the development of a porous, fissured structure of the core melt that better allows the cooling water to reach the still-liquid residual melt than does this latter residual melt. The sacrificial layer in general or the sacrificial concrete in particular preferably also serve to lower the melting point of the mixture of the core melt and sacrificial material. These latter discoveries have already been mentioned in U.S. Pat. No. 5,343,506 (German DE-OS 40 41 295), but it pertains to a core retaining device that operates by the crucible principle. In other words, the core melt cannot spread over a large area but instead is caught in a steel crucible placed directly beneath the reactor pressure vessel.

It has proved especially favorable to line the surface of the retaining device, which is the first to contact the core melt, with a zirconium fiber layer (zirconium felt or zirconium nonwoven) and with a metal lattice grating that covers and is placed on the zirconium fiber layer. The double layer of zirconium fibers and a metal lattice grating may be provided directly below a liner or steel plate in an interstice between the latter and a layer of ceramic blocks; it can also, however, be placed as an outer double layer onto the ceramic blocks and in particular zirconium oxide blocks. Both zirconium felt and the zirconium oxide blocks have the advantage that they do not undergo major heating from neutron radiation; zirconium or the alloy known as Zircalloy is for this reason an essential ingredient in fuel assembly cladding tubes. The temperature resistance of zirconium or zirconium oxide ceramic is advantageous. Because of its fiber structure, the zirconium felt reduces the thermal shock to which the ceramic blocks (second partial layer) are exposed. The lattice grating placed in the sandwich structure on the zirconium felt keeps the zirconium felt in its position as the core melt flows out, and at the same time the grid form dissipates so much energy that the core melt solidifies in the mesh openings in the grid after a short time.

Depending on the power level of the nuclear reactor installation and accordingly depending on the amount of core melt produced, a sacrificial concrete layer may also be provided as an outer layer over a steel plate (liner) that covers the ceramic blocks. Such a sacrificial concrete layer is especially highly suitable for integration into it of a cooling system with inlet channels that open as a function of temperature, so that a coolant can be supplied to the core melt upon contact with the core melt. The sacrificial layer or sacrificial concrete layer is penetrated in particular by a pipeline system whose pipes have upward- protruding, normally closed inlet necks that melt open on contact with the core melt.

If the surface cooling of the core melt by a film of cooling water is sufficiently great, then to cool the core melt from its underside it may suffice to embed many coolant deposits in the form of meltable containers in the sacrificial layer, distributed over the bottom face thereof.

A preferred coolant is normal (so-called light) water, which after evaporation and condensation inside the containment of the spreading chamber can be replenished from an internal flood container (this is known as IRWST, for in-containment refueling water storage tank).

The bearing and containment structure in particular includes a bottom structure and—if there is a possibility of contact with the spreading core melt—a wall structure as well.

Other features which are considered as characteristic for the invention are set forth in the appended claims.

Although the invention is illustrated and described herein as embodied in a device for retaining a hot melt, in particular a core melt-through inside the spreading chamber of a nuclear reactor installation, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Referring now to the figures of the drawing in detail and first, particularly, to FIG. 1 thereof, there is seen a bearing and containment structure A (referred to as "structure" in the following), shown in a detail of the bottom region, of a first retaining device RV1. The structure A includes a spreading space, hereinafter also referred to as a spreading chamber 5, of a nuclear reactor installation. The structure A or bottom structure A1 generally comprises so-called structural concrete; existing reinforcements such as tension cables or steel beams are not illustrated, for the sake of simplicity. The structure A is followed by the protective and insulating layer, identified overall as B. The layer B comprises a first partial layer B1, adjacent the bottom structure A1, of fireproof concrete and a second partial layer B2, disposed between an outer sacrificial layer C and the first partial layer B1, of temperature-proof ceramic blocks 1. These preferably right parallelepiped (cuboid) ceramic blocks 1 are in particular zirconium oxide blocks ($ZrO_2$ blocks). Seams 2 and suitably also expansion seams 2' are provided between some or all of the adjacent $ZrO_2$ blocks. This applies to all the exemplary embodiments shown below, even if no expansion seams 2' are especially shown.

The second partial layer B2 is covered on its outside with a zirconium fiber layer C1, which by way of example is 20 mm thick and may comprise zirconium felt or zirconium nonwoven. On its outside, the zirconium fiber layer C1 is covered by a metal lattice grating C2 placed on it, whose thickness is 30 mm, for instance, and whose grid structure is shown in FIGS. 2 and 3 in plan view and in an enlarged plan view. For the protective and insulating layer B, a thickness of approximately 500 mm and for its partial layers B1, B2 a thickness of approximately 250 mm each have proved to be advantageous. The lattice grid C2 and zirconium fiber layer C1 protect the ceramic blocks 1, if spreading core melt is present, against mechanical strain and also form a heat sink. Zirconium and in particular $ZrO_2$ blocks or ceramic has an especially high corrosion resistance to molten metals or metal alloys. A core melt cooled on its top by a water film and spreading over the sacrificial layer identified overall by the letter C, is accordingly not capable of dissolving this sacrificial layer C immediately, and the dimensioning of this layer will preferably be chosen such that the core melt begins to solidify before the layer C has been "sacrificed". A spacing width w of the grid mesh openings 3 is 30 mm, for instance, and a spacing width b of the grid bars 4 is 10 mm, for instance.

Figure 4:
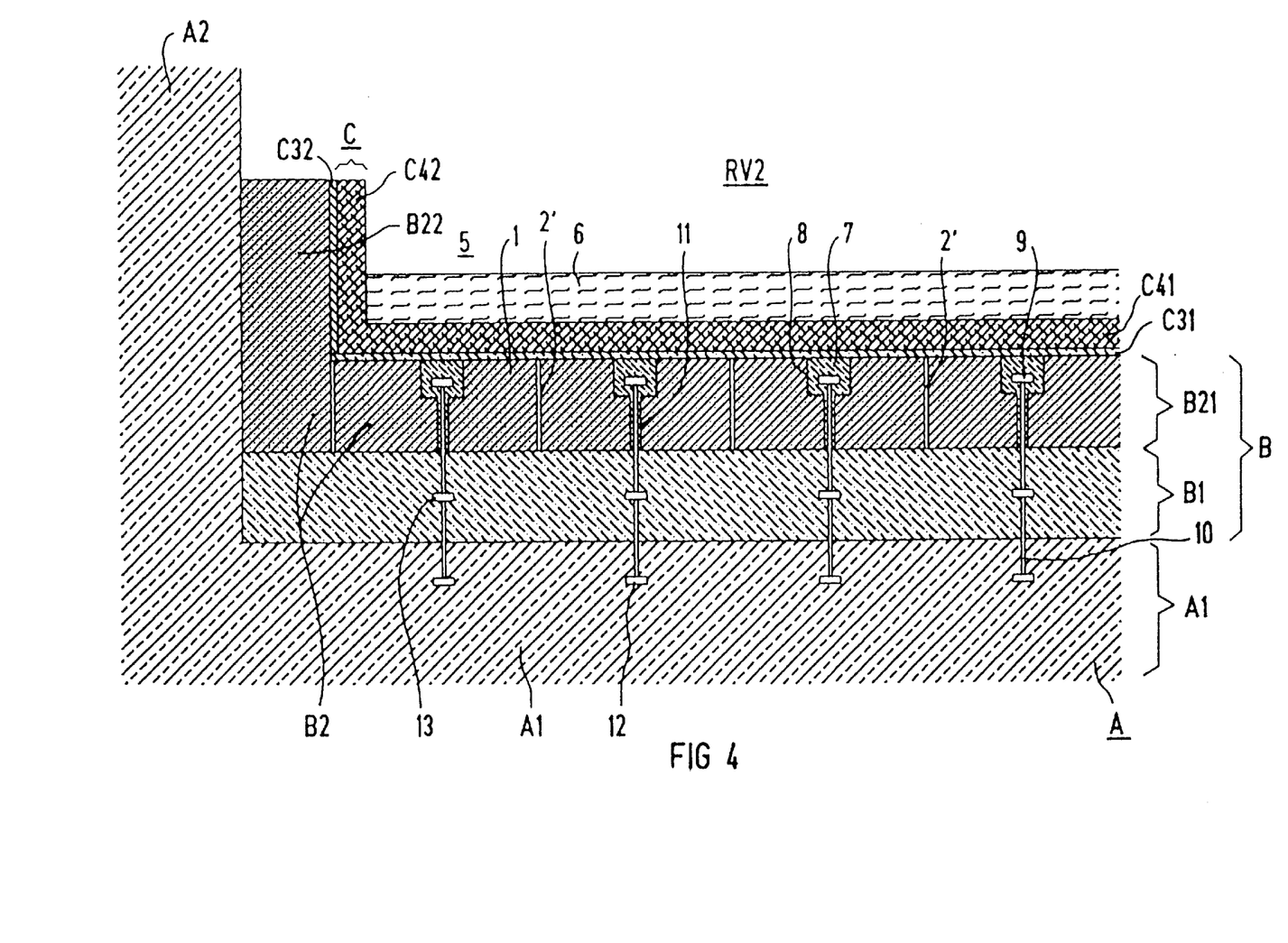
FIG. 4 is a cross-sectional view through a bottom and wall region of a second exemplary embodiment of a retaining device according to the invention, with a second multi-layer protective cladding.

In the exemplary embodiment of a second retaining device RV2 of FIG. 4, the structure A is shown not only with its bottom structure A1 but also with its wall structure A2 in a detail. The sacrificial layer C is modified over FIG. 1, for instance, in such a way that it comprises one steel plate C31 for the bottom region and one steel plate C32 adjacent to it for the wall region, as well as an outer layer C41 of sacrificial concrete for the bottom region and one layer C42 of sacrificial concrete for the wall region; these two layers C41 and C42, like the steel plates C31, C32, form a closed covering. The core melt (or generally: hot melt) 6 is located, shown schematically, in the spreading chamber 5. Once again, the dimensioning of the multi-layer protective cladding is chosen such that the sacrificial layer generally shown as C is melted or consumed (sacrificed) by the melt 6 once the melt 6 changes state to solidification or has solidified.

To prevent a deformation of the protective and insulating layer B and with it of the sacrificial layer C under the thermal, mechanical and chemical strain for the melt 6, the protective and insulating layer B is anchored to the bearing and containment structure A. To that end, on the ceramic blocks 1, in particular $ZrO_2$ blocks, voids 8 are provided that can be filled with fireproof concrete 7 or suitable ceramic plugs and that receive the heads or nuts 9 of tie bolts 10. These tie bolts 10 are anchored in the structure A and penetrate the first partial layer B1 of fireproof concrete and also penetrate corresponding anchoring conduits 11 in the ceramic blocks 1. In addition to the anchoring points 12 in the structure A, further anchoring points 13 may be provided in the fireproof concrete B1. Corresponding anchoring means may be provided in the partial layer B22, between it and the wall structure A2. The anchoring means 9–13 prevent the second partial layer B21 or the ceramic blocks from floating upward. Since the thermal strain, given the low height of the core melt 6 shown, for the wall structure A2 is not as high as that for the bottom structure, it is possible in the wall region, as shown, to omit a fireproof concrete intermediate layer B1. Once again, the expansion seams between the ceramic blocks 1 are marked 2'.

Figure 5:
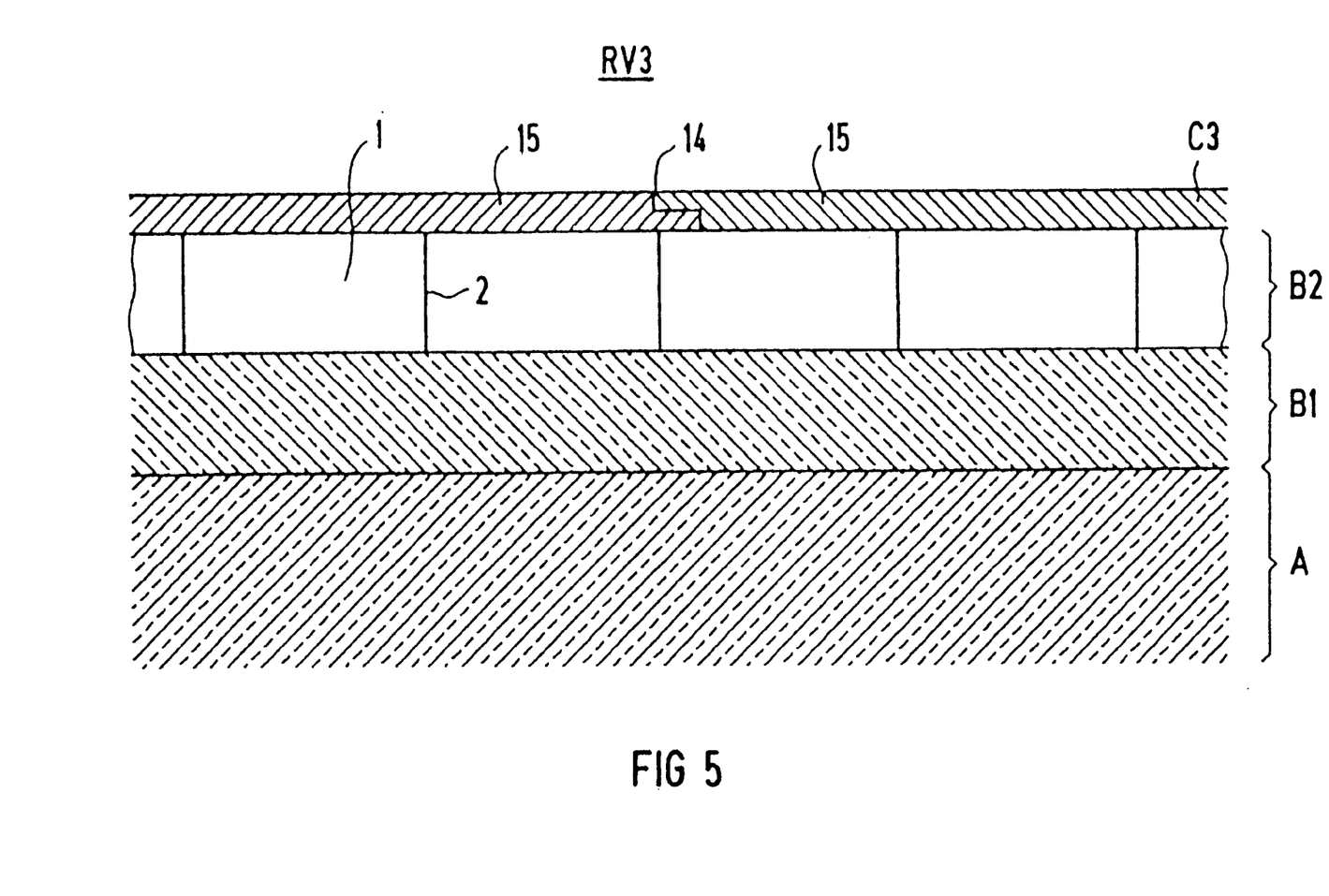
FIG. 5 is a cross-sectional view through a bottom region of a third embodiment of a multi-layer protecting cladding.

In the retaining device RV3 of FIG. 5, the protective cladding with the layers B1, B2 and C3 is largely equivalent to that in the retaining device RV2 of FIG. 4; the only difference is that the outer sacrificial concrete layer C41 (in FIG. 5, only the bottom region is shown) is left out, and instead the steel plate C3 is increased in its thickness, for instance to a thickness of 80 mm. To avoid shifting of the steel plate C3, this plate is provided with cross joints 14, in the vicinity of which the partial plates of the steel plate C3 mesh form-lockingly with one another. Existing expansion seams between the ceramic blocks 1 and the partial steel plates 15 are not shown separately in the drawing.

Figure 1:
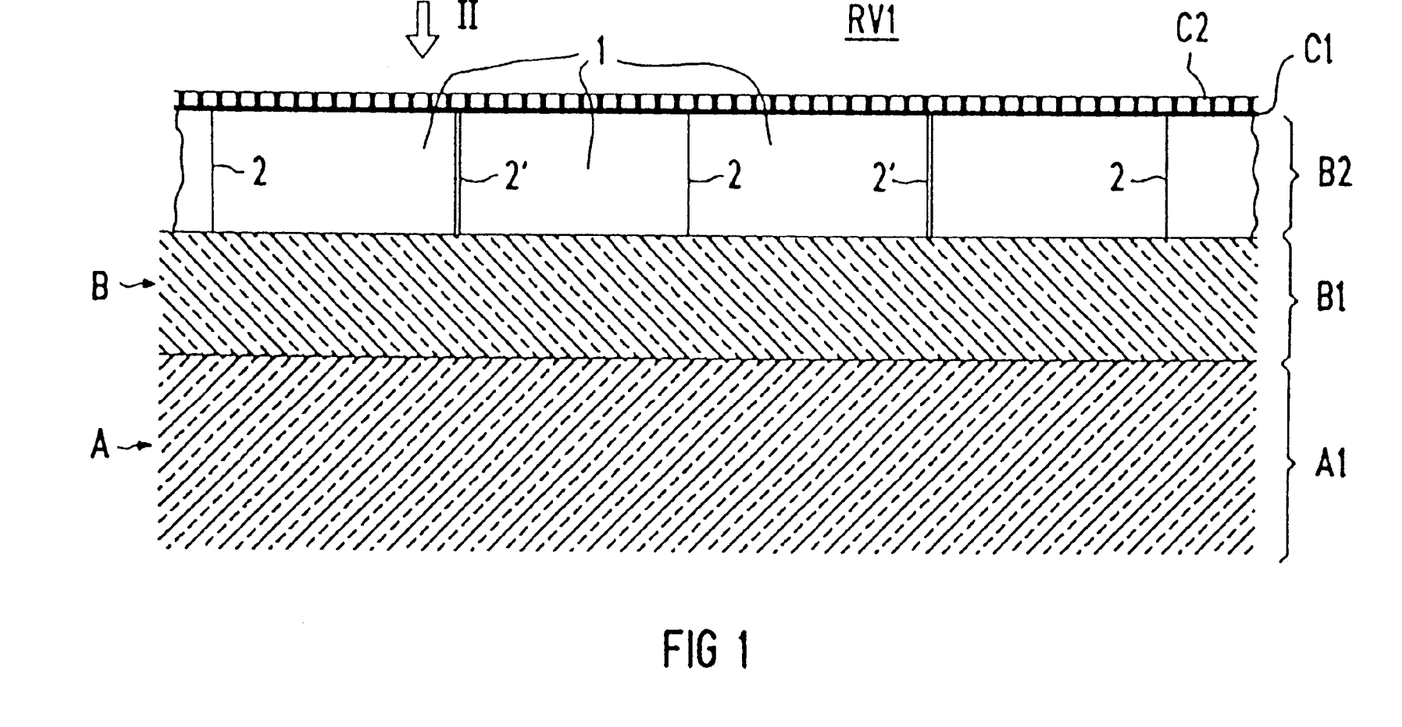
FIG. 1 is a cross-sectional view of a retaining device according to the invention with a first multi-layer protective cladding, the section taken through the bottom region of the spreading chamber.
Figure 2:
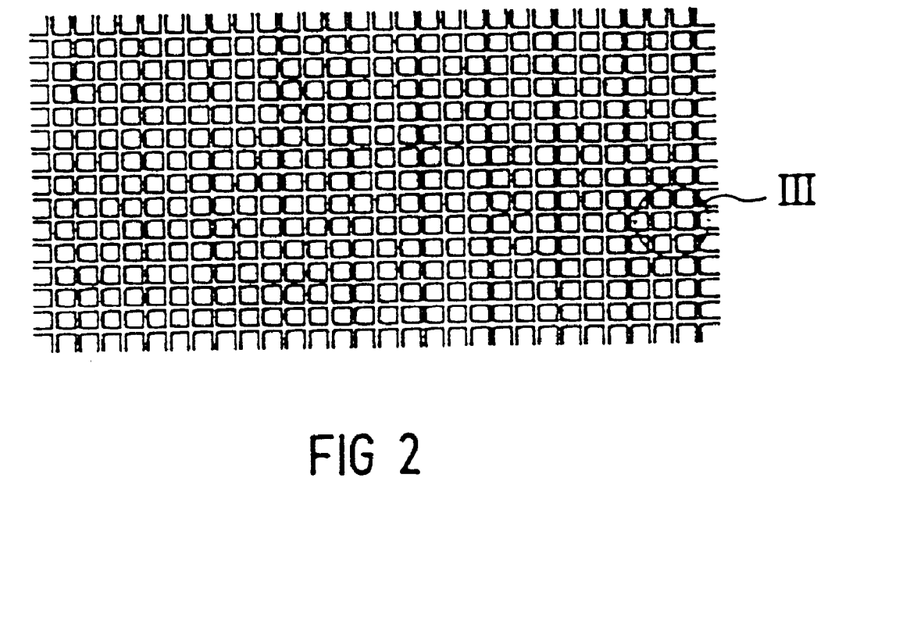
FIG. 2 is a plan view onto the area II of FIG. 1, detailing an outer lattice grating.
Figure 3:
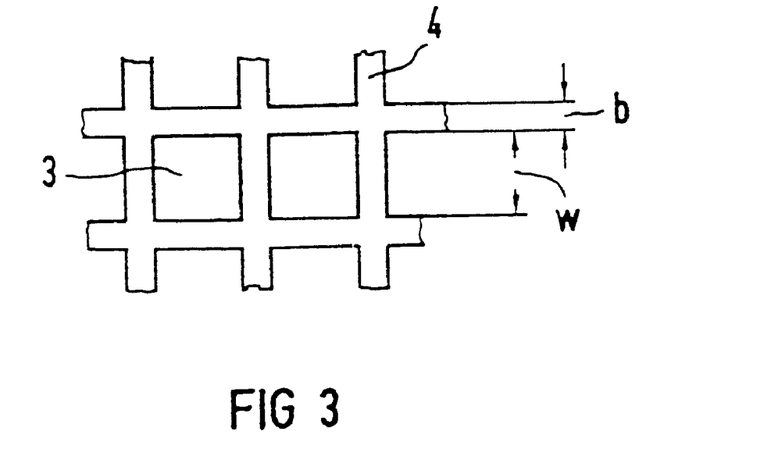
FIG. 3 is a plan view of the detail III of FIG. 2, on a larger scale, of the lattice grating mesh.
Figure 6:
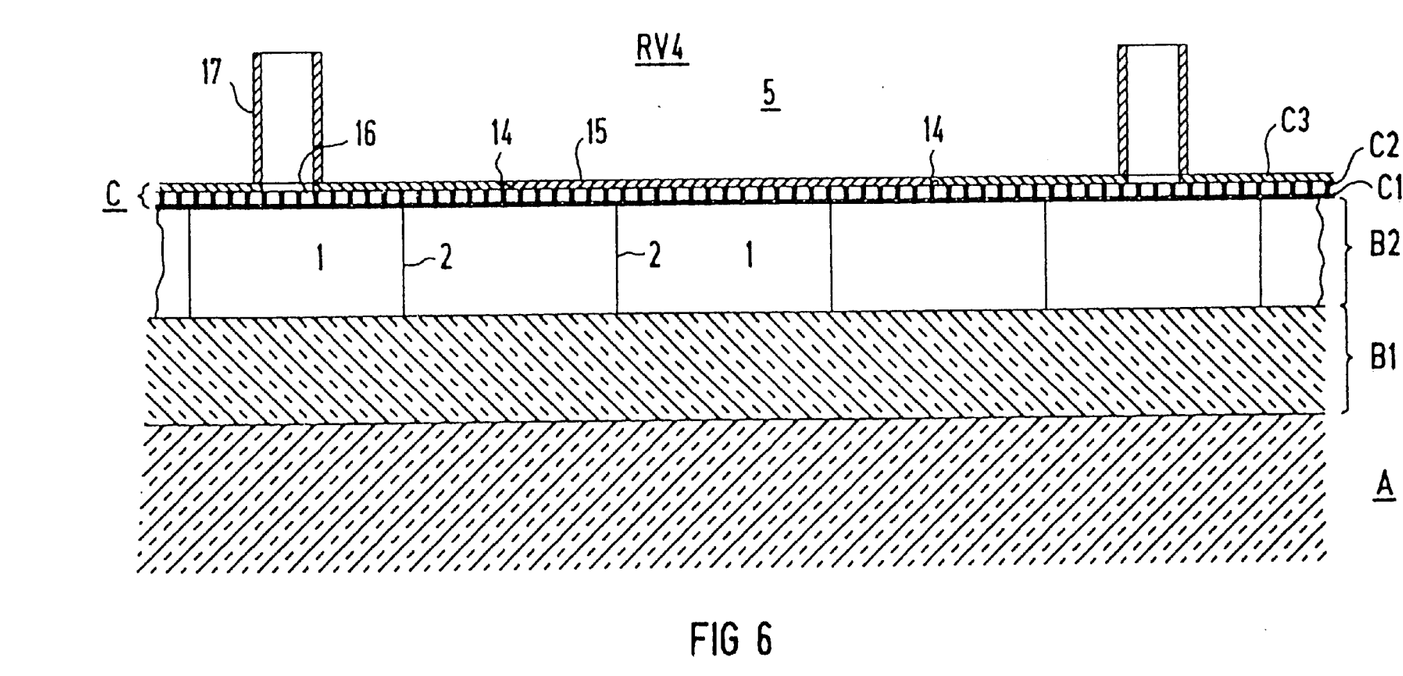
FIG. 6 is a view similar to FIG. 1 of a modification of the retaining device shown therein, with an additional outer lining and cooling-water inlet necks and steam outlet necks associated therewith, representing a fourth embodiment.

The retaining device RV4 of FIG. 6 (which again is shown only in the bottom region) differs from the retaining device RV1 of FIGS. 1–3 in that a steel plate C3, which comprises individual partial plates 15 with cross joins 14 between them, is placed on the lattice grating C2 of the sacrificial layer C. This steel plate C3, which can also be called a liner, is provided with steam outlet openings 16, which at the same time are cooling water inlet openings. Connected to these openings 16 are inlet and outlet necks 17 that protrude into the spreading chamber 5 or into a spreading space. These inlet and outlet necks 17 serve the purpose of inflow of the cooling water if the level therefore has risen above the top edge of the necks 17, so that the cooling water can pass into the chambers of the lattice grating C2 through the interstice between the steel plate 3 and zirconium felt C1, so that the core melt is also cooled from beneath. The necks 17 also serve to allow any possible steam to flow out.

Figure 7:
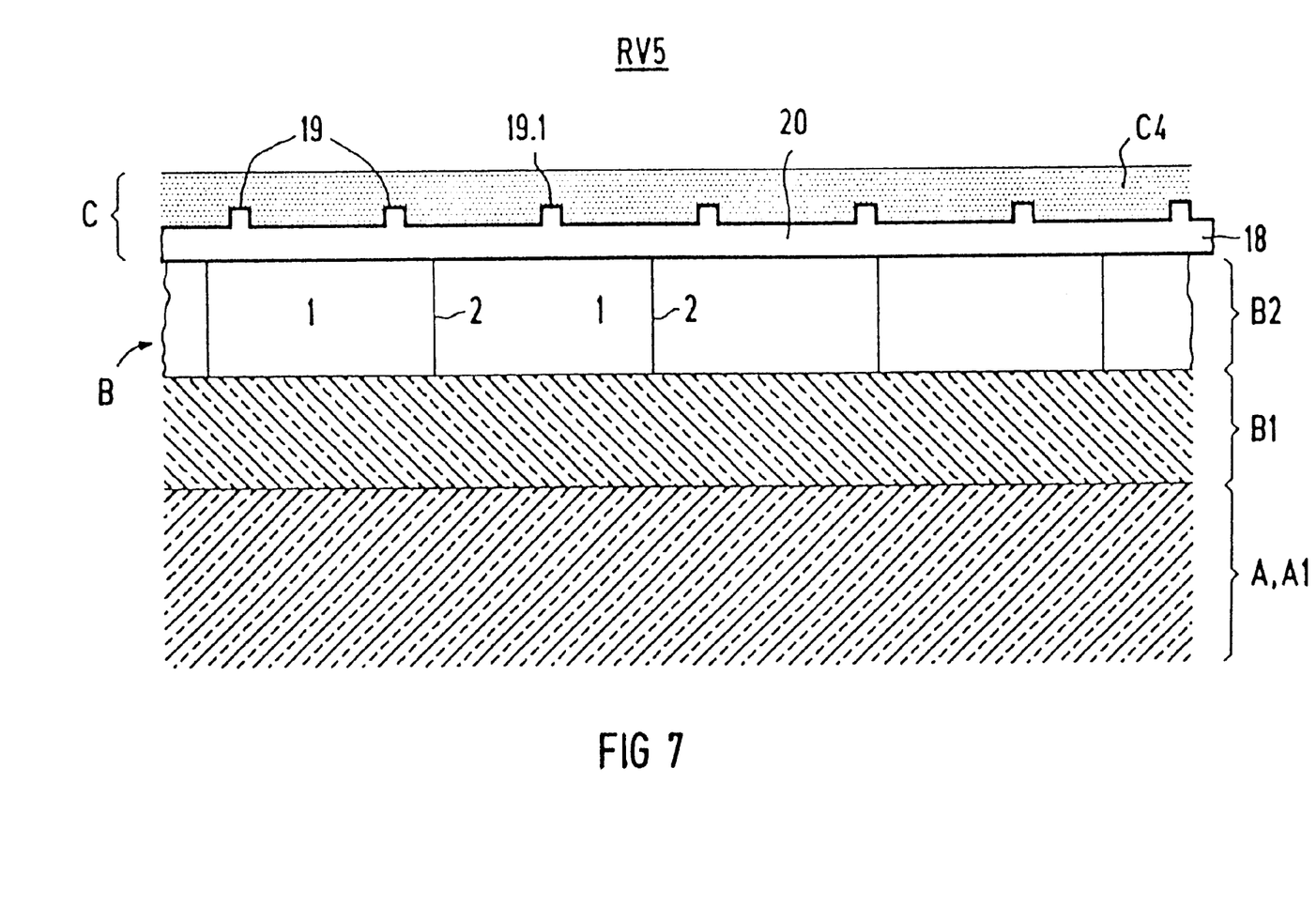
FIG. 7 is a similar view of a fifth embodiment of the retaining device, in which the outer sacrificial layer comprises sacrificial concrete and a coolant pipe system integrated therein.

The retaining device RV5 of FIG. 7, which is likewise shown only in a detail of a bottom region, corresponds in principle to the retaining device RV2 of FIG. 4, with the difference that instead of a steel plate, a cooling system 18 is integrated with the sacrificial layer C and covered by a sacrificial concrete layer C4. The cooling system 18 is in particular pipelines 20 distributed over the bottom face of the retaining device RV5. It may also be a flat case that is reinforced with partitions. At regular intervals, closed necks 19 are located on the case or pipelines. If a core melt is spreading, then first the sacrificial concrete is melted, and the small cooling water outlet necks 19 are likewise melted in their top region 19.1 and therefore open. This opening process is reinforced by the existing internal pressure in the cooling system 18. Thus the core melt is not only cooled by an upper film of cooling water (not shown) but also is cooled on its underside. Fragmentation and solidification of the core melt therefore ensue relatively quickly, thus preventing the core melt from further penetrating the protective and insulating layer B beyond the top of the ceramic blocks 1.

Figure 8:
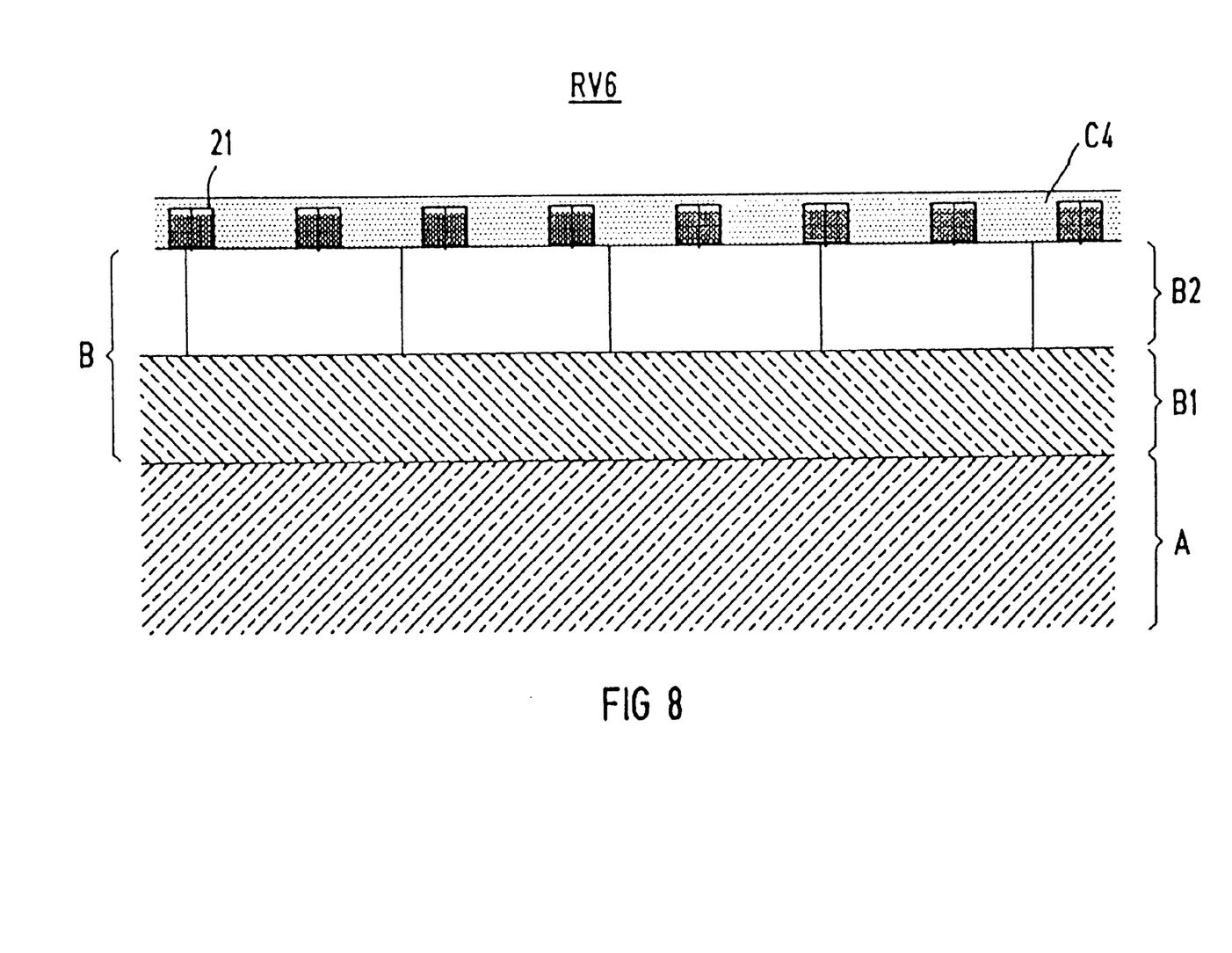
FIG. 8 is a cross-sectional view through the bottom region of a sixth embodiment, which is a modification of the embodiment of FIG. 7, in that the coolant pipe system is replaced with water-filled plugs.

The retaining device RV6 of FIG. 8 differs from that (RV5) of FIG. 7 in that many coolant deposits—distributed with the most uniform possible pitch over the spreading surface, in the form of meltable small containers 21 are provided over the bottom face of the sacrificial layer C and embedded in it. The primary effect of the containers 21 is to cause small local eruptions in the case of a core melt and hence to cause fragmentation of the core melt which thus becomes more preamble. The side effect is slight cooling. The sacrificial concrete in which the containers 21 are embedded is again identified as C4.

Figure 9:
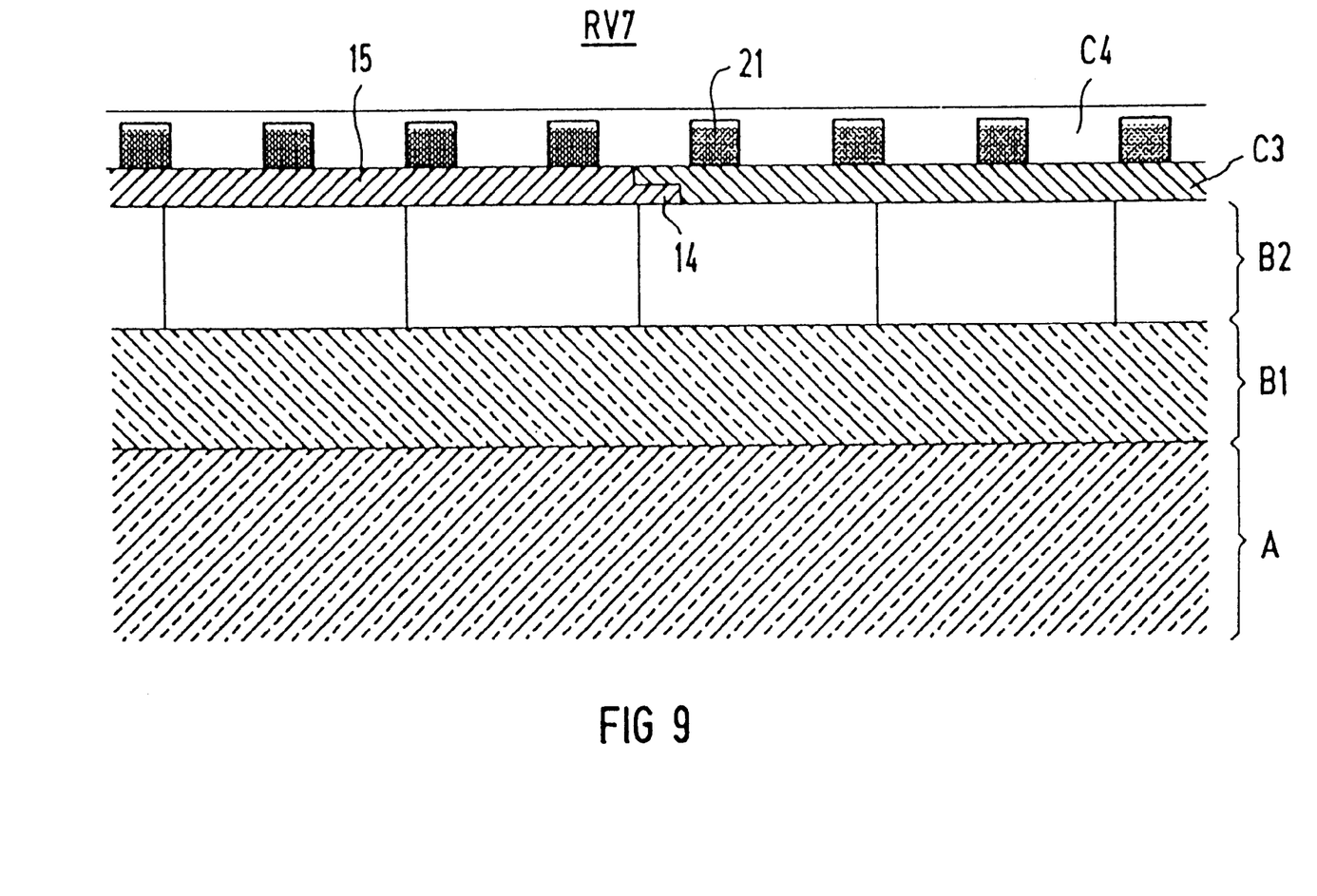
FIG. 9 is a similar view of a seventh embodiment in which, as compared to the embodiment of FIG. 8, the outer sacrificial layer has a steel plate on its underside.

The retaining device RV7 of FIG. 9 is fundamentally equivalent to that of FIG. 8, except for the characteristic that a steel plate C3 is inserted as an intermediate layer between the second partial layer B2 of ceramic blocks and the outer layer C4 of sacrificial concrete and the cooling water containers 21 let into it. This steel plate, which again comprises partial plates 15 with cross joints 14, is relatively thick; for instance, it has a thickness of 90 mm. The entire sacrificial layer has a thickness of 200 mm, for instance, and the sacrificial concrete layer C4 a thickness of 120 mm, for instance, and the cooling water containers 21 embedded in it have a height of 100 mm, for instance. The mutual spacing chosen for the containers 21, which is 300 mm, can be further reduced to intensify fragmentation of the core melt.

Figure 10:
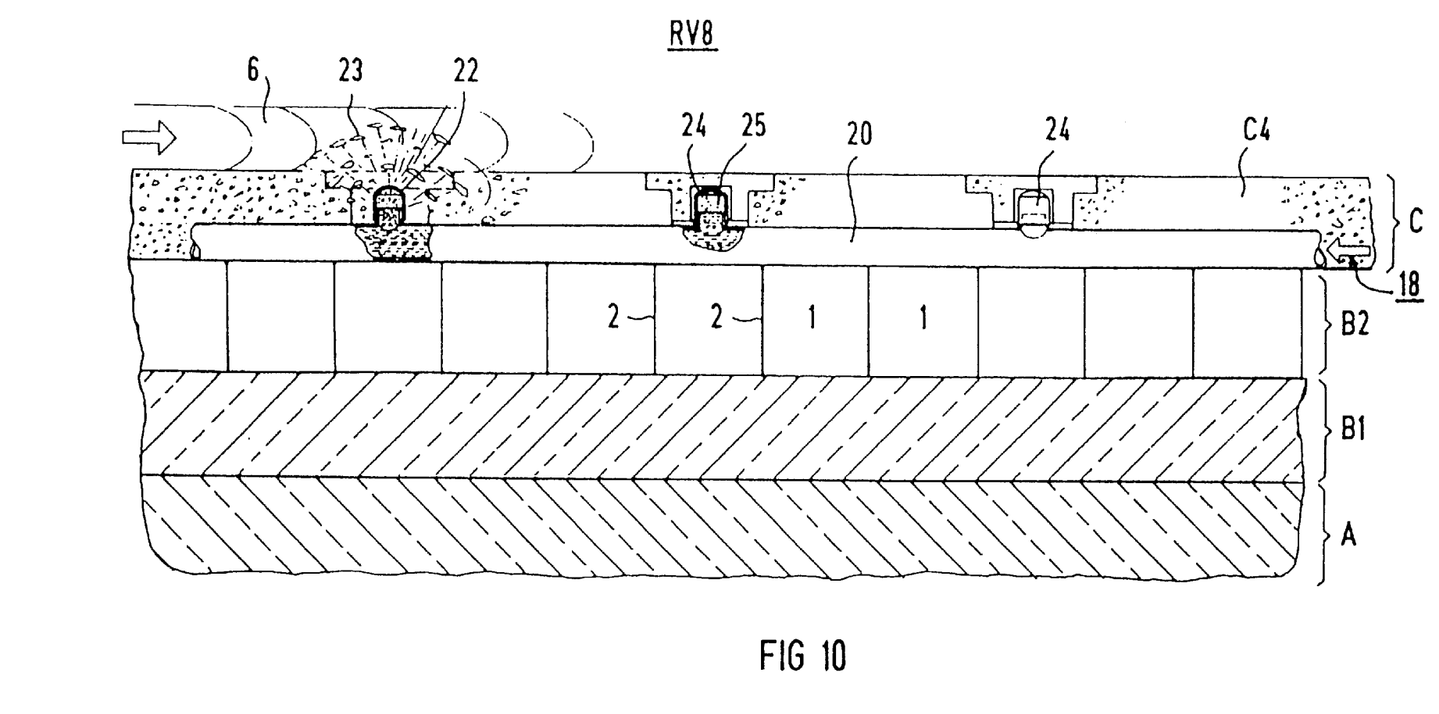
FIG. 10 is a similar view of an eighth embodiment, which is a variation of the fifth embodiment shown in FIG. 7, and in which the necks of the coolant pipe system embedded in the sacrificial layer eject a stream of cooling water upon contact with the core melt, which causes at least partial fragmentation of the core melt portions cooled in this way.

The retaining device RV8 of FIG. 10 is fundamentally equivalent to that (RV5) of FIG. 7, except that the necks 22 of the cooling system 18, which are disposed on suitable pipelines or case bodies 20, are especially designed such that at the moment of the melt, with internal overpressure, they eject a stream of cooling water 23, which leads to partial fragmentation of the core melt 6 located above the sacrificial layer 10, as is schematically shown in the drawing. To that end, it is especially favorable to fit a plastic cap 24 sealingly over the necks 22 and to dimension the fill level in the cooling system 18 such that an air cushion 25 can form inside each of the necks 22. This air cushion 25, in combination with the plastic cap 24, acts as a thermal insulator so that if the mixture of core melt and melted sacrificial concrete C4 comes into contact with the respective plastic cap 24, the cap melts through abruptly.

Figure 11:
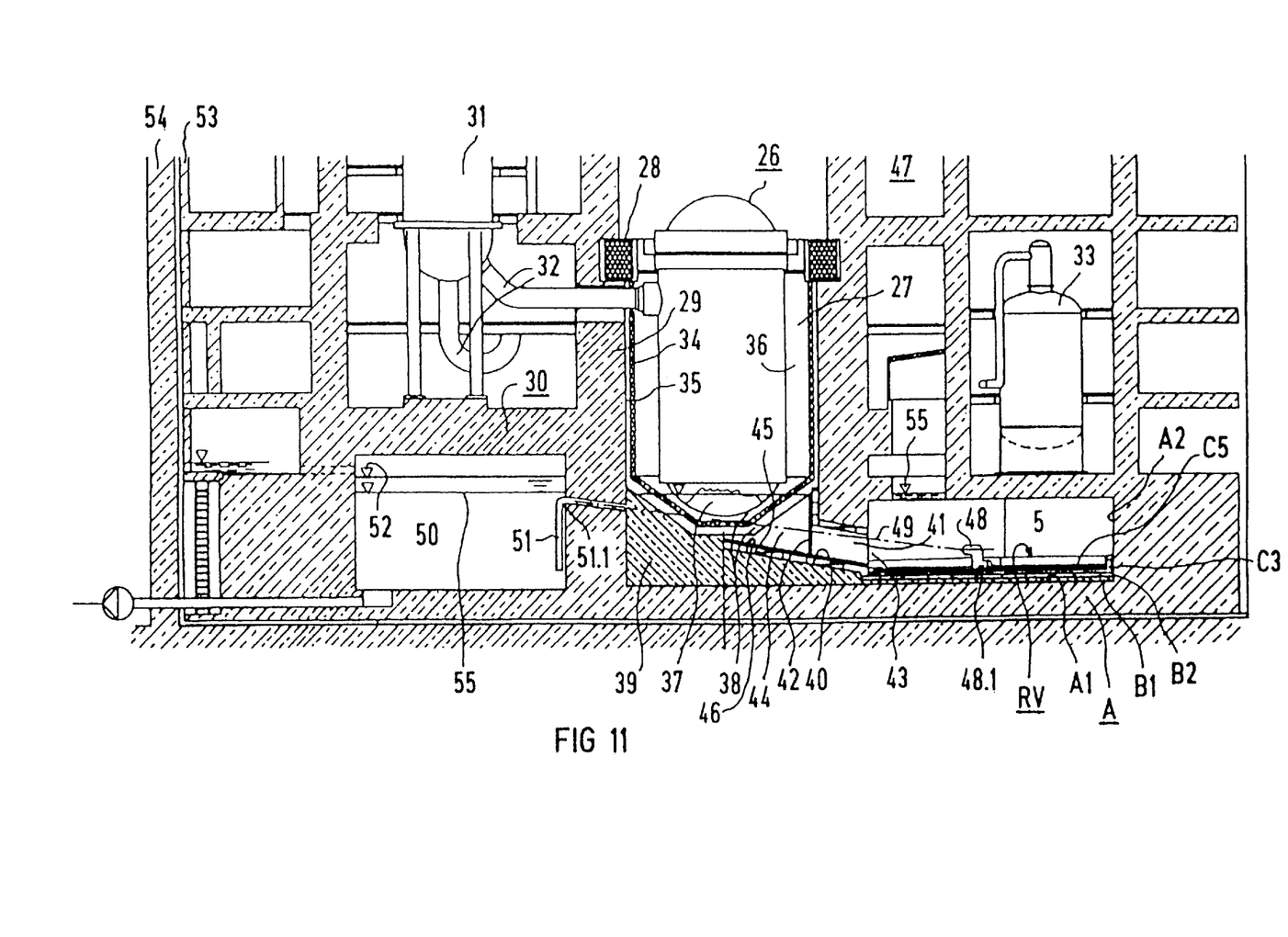
FIG. 11 is a section through a nuclear reactor installation with a reactor pit, a nuclear reactor pressure vessel located in the pit, and a spreading chamber that can be made to communicate with the reactor pit via an inclined conduit; the chamber is equipped with a retaining device according to the invention. Since the entire system is illustrated, the retaining device in it is seen on a small scale.

FIG. 11 shows a retaining device, generally identified by the letters RV, which is built into the spreading chamber 5 (or spreading space) of a nuclear reactor installation. All that is shown of the latter, in detail, are the nuclear reactor pressure vessel 26, which is the primary component of a pressurized water nuclear reactor installation, and which is disposed inside a reactor pit (also known as a shield pit) 27 and is supported on a load-bearing shield 29 by means of a support ring construction 28. Also visible, in corresponding containment chambers inside the concrete construction 30, is one of the steam generators 31 (in a four-loop installation there are four of these, communicating with the pressure vessel 26 via primary coolant lines 32 via a main coolant pump (not shown). Also connected to the primary loop via a pressure switch, not visible, is a pressure-maintaining blow-off container 33. The reactor pit 27 is subdivided by a heat insulator 34 into an outer gap chamber 35 serving the purpose of ventilation as an inner inspection gap chamber 36. Located below the rounded bottom portion 37 of the pressure vessel 26 is a space 38, which is bounded at the bottom by a base 39 of fireproof concrete, which forms an inclined plane 30 in the direction toward the spreading chamber 5. Located above the inclined plane 40 is a correspondingly inclined conduit 41, which penetrates the wall of the support structure or load-bearing shield 29 and which in the case of a core melt establishes a communication between the space 38 and the spreading chamber 5. The conduit 41 in normal operation has a double bulkhead, specifically on the inlet side a partition 42 that can be destroyed by the core melt and on the output side a sealing plate 43. This latter prevents cooling water from penetrating into the conduit 38, 38 is called both a conduit and a space], in case in an irregular situation water should penetrate the spreading chamber 5. The space 38 is for the most part filled, in its region toward the conduit 38, with a positive displacement body 44 that can be melted open by the core melt. The positive displacement body 44 is embodied of steel case construction, for instance. It prevents an accumulation of water in this region, which reduces the potential risk of a steam explosion. The inclined plane 40 (which may also be a flat groove) is lined with a temperature-resistant layer 45, for instance of ceramic blocks, and located on this layer 45, which at the same time is heat-insulating, is a sacrificial layer 46 of a temperature-proof material, such as a steel alloy, which continues as far as the outlet of the conduit 38.

The retaining device RV may be embodied like one of the retaining devices RV1–RV8 described above and shown in FIGS. 1–10. A structure A is shown as part of the concrete construction 30 of the containment 47, including a bottom structure A1 and a wall structure A2 comprising structural concrete. The protective cladding of the structure A comprises the lower protective and insulating layer B1, B2 and the sacrificial layer C3, C5 located above it. The symbols have the following meanings:

B1=first partial layer of fireproof concrete;
B2=second partial layer, covering the first partial layer B1, comprising ceramic blocks and in particular $ZrO_2$ blocks;
C3=steel plate, lined from behind in the wall region with ceramic blocks, in particular $ZrO_2$ blocks;
C5=outer layer of the sacrificial layer, comprising sacrificial concrete.

It can be seen that the layering of the retaining device RV of FIG. 11 is largely equivalent to that of FIG. 4. Because the view is shown on a relatively small scale, no tie bolts are shown in FIG. 11. The layers B2 and C3 are not raised upward, on the side of the retaining device RV toward the mouth of the inclined conduit 41, so that the possible core melt can take a direct path to the bottom of the retaining device RV and spread out therein.

The spreading chamber 5 and the retaining device RV have a polygonal outline. In the region of the partition between the spreading chamber 5 and the IRWST 50, there is a closure device 48 in the form of an approximately S-shaped pipe bend, which is connected to an inclined pipeline 49 suggested by dot-dashed lines. This pipeline is extended through the concrete construction 30 as far as a cooling water reservoir 50 and is joined via a pipe elbow to a riser pipe 51. In the normal operating state, the cooling water level 52 is located far above the upper end of the riser pipe 51 or its pipe elbow 51.1, so that from the pipe elbow to this water level 52, a volume of cooling water of 220 $m^3$, for instance, plus the primary loop volume is available. The cooling water reservoir 50 is also known for short as an IRWST (in-containment refueling water storage tank). By means of the riser pipe 51 it is assured that in the event of a core melt, the cold water will be available for cooling on the bottom of the IRWST; an air relief bore (not shown) in the region of the pipe elbow 51.1 serves to terminate the lifter action in the riser line 51 if the water level drops below the pipe elbow.

The outer end 48.1 of the closure device 48 is embodied for instance as a plastic pipe which melts upon contact with the core melt, even if cooling water is located in it. In the highly unlikely event of a core melt, the melt would first collect in the space 38 and for instance after a holding time of 30 minutes, would have melted the positive displacement body 44 and the partition 42 open so that it propagates through the inclined conduit 41 as far as the sealing plate 43 on the end of the conduit 41. The sealing plate 43 is melted open within a relatively short time, so that core melt can now spread over a large area on the sacrificial layer C5 of the retaining device RV and in the process also reaches the closure device 48 and causes its mouth piece to melt open. The cooling water is now capable of taking its course from the cooling water reservoir 50 via the riser pipe 51, the pipeline 49 and the closure device 48 to the surface of the core melt, where it evaporates. The water vapor spreads in the containment 47 and condenses for the most part on the relatively cool inside surfaces of the containment 53, which for instance is made of steel, and which as is shown in the left-hand portion of FIG. 11 is still surrounded by a concrete sheath 54 (for protection in the event of an airplane crash or the like). Whether the core melt, not shown in FIG. 11, is liquid or partially doughlike or has already solidified, it is kept away from the structural concrete A, A1, A2, by the retaining device RV, or in other words by its layers, which—in order from the outside in—are marked C5, C3, B2, B1. The phase of intensive cooling of the core melt lasts until such time as the core melt has solidified. This solidification process can be further speeded up by water cooling from the underside of the core melt (not shown in FIG. 11), as has been explained in conjunction with FIGS. 7–10. The water level 55 above the ceiling of the spreading chamber 5 indicates the water level of the cooling water in the event that the intended cooling water volume has passed out of the IRWST into the spreading chamber 5, so that the same water level 55 is established in the communicating IRWST 50. The closure device 48, in a preferred general embodiment, has a temperature-dependent opening mechanism, from which the coolant is kept away by suitable provisions so that early temperature-dependent opening of the closure device is assured. For this purpose, the closure device may have a plastic block or plastic plate as a sealing element, which is flanged in each case to the pipeline 49. The closure device may also have a sealing element with a specified rated breaking performance, which under the influence of heat from the melt, by tearing, bursting or otherwise being destroyed, opens up the pipeline. To that end, the sealing element is for example a bursting disk or a bursting diaphragm of glass or a metal. It may also have a sealing element with a sealing flap which is kept closed by an expansion bolt. The expansion bolt is preferably a metal melting bolt, for instance of silver. The closure device may moreover be embodied in hoodlike fashion and may communicate in a sealing fashion in a pipeline via a melting solder connection.

The invention can advantageously be employed not only in nuclear reactor installations in the event of the highly unlikely instance of a core meltdown but anywhere where it is important to protect building structures against a hot, spreading melt, one example being in foundries, in the event that the melt should escape from its normal melt bed into adjacent zones of the building.

We claim:

1. In combination with a water-cooled nuclear reactor installation having a pressure vessel and a space below the pressure vessel for receiving a core melt in the case of a core meltdown, the space below the pressure vessel having a given area, a retaining device comprising:

a spreading chamber disposed laterally offset from the space below the pressure vessel and lower than the space below the pressure vessel and having a spreading area larger than the given area of the space below the pressure vessel for spreading the core melt over said spreading area and for cooling the core melt;

an obliquely inclined conduit connecting the space below the pressure vessel with said spreading chamber;

said spreading chamber having a bearing and containment structure;

a protective layer disposed upwardly adjacent on and protecting said bearing and containment structure of said spreading chamber;

an outer sacrificial layer disposed upwardly adjacent on said protective layer, said outer sacrificial layer being melted when in contact with the core melt and cooling the core melt; and a cooling system for a delayed supplying of a coolant having temperature-dependently opening feed channels integrated in said outer sacrificial layer, for supplying the coolant to the core melt when said temperature-dependently opening feed channels get in contact with the core melt.

2. The retaining device according to claim 1, wherein said protective layer includes a first layer of concrete adjacent said bearing and containment structure, and a second layer of ceramic blocks adjacent said sacrificial layer.

3. A water-cooled nuclear reactor installation, comprising:

a pressure vessel;

a space below said pressure vessel for receiving a core melt in the case of a core meltdown, said space below said pressure vessel having a given area;

a spreading chamber disposed laterally offset from said space below said pressure vessel and lower than said space below said pressure vessel for receiving the core melt;

an obliquely inclined conduit connecting said space below said pressure vessel with said spreading chamber;

said spreading chamber having a spreading area larger than said given area of said space below said pressure vessel for spreading the core melt over said spreading area and for cooling the core melt; and said spreading chamber including a bearing and containment structure, a protective layer disposed upwardly adjacent on and protecting said bearing and containment structure of said spreading chamber, an outer sacrificial layer disposed upwardly adjacent on said protective layer, said outer sacrificial layer being melted when in contact with the core melt and cooling the core melt, and a cooling system for a delayed supplying of a coolant, said cooling system having temperature-dependently opening feed channels integrated in said sacrificial layer, for supplying the coolant to the core melt when said temperature-dependently opening feed channels get in contact with the core melt.

4. The retaining device according to claim 1, wherein said protective layer includes ceramic blocks of zirconium oxide.

5. The retaining device according to claim 4, wherein said ceramic blocks are right parallelepiped, and horizontally adjacent said blocks define expansion seams therebetween.

6. The retaining device according to claim 1, wherein said outer sacrificial layer is a sacrificial concrete layer covering said protective layer.

7. The retaining device according to claim 1, wherein said cooling system utilizes water as a coolant.

8. The retaining device according to claim 1, wherein said bearing and containment structure includes a bottom structure on which said protective layer is disposed.

9. The retaining device according to claim 1, wherein said cooling system includes a pipeline system penetrating said sacrificial layer, said pipeline system including pipes with upwardly-projecting, normally closed inlet necks which melt upon coming into contact with the melt.

* * * * *

UNITED STATES PATENT AND TRADEMARK OFFICE
CERTIFICATE OF CORRECTION

PATENT NO. : 6,192,097 B1
DATED : February 20, 2001
INVENTOR(S) : Gerhard Hau et al.

It is certified that error appears in the above-identified patent and that said Letters Patent is hereby corrected as shown below:

<u>Column 8,</u>
Line 25, should read -- becomes more permeable. The side effect is alight cooling. --

Signed and Sealed this

Eleventh Day of February, 2003

JAMES E. ROGAN
*Director of the United States Patent and Trademark Office*